United States Patent [19]
Bolsworth et al.

[11] Patent Number: 5,282,662
[45] Date of Patent: Feb. 1, 1994

[54] REAR SEAT FOR ALL PURPOSE VEHICLE

[75] Inventors: James Bolsworth; Kenneth S. Pyszel, both of Sterling Heights; Joseph D. Kondziola, Troy, all of Mich.

[73] Assignee: General Motors Corporation, Detroit, Mich.

[21] Appl. No.: 990,206

[22] Filed: Dec. 14, 1992

[51] Int. Cl.$^5$ .................................... B60N 1/02
[52] U.S. Cl. ........................ 296/65.1; 297/331; 297/378.12
[58] Field of Search ............... 296/65.1; 297/331, 379

[56] References Cited

U.S. PATENT DOCUMENTS

| | | | |
|---|---|---|---|
| 4,372,610 | 2/1983 | Fisher, III | 297/379 |
| 4,484,779 | 11/1984 | Suzuki | 297/331 |
| 4,700,989 | 10/1987 | Ercilla | 297/331 |
| 4,773,693 | 9/1988 | Premji et al. | 296/65.1 |
| 4,865,377 | 12/1989 | Musser et al. | 296/65.1 |

*Primary Examiner*—Robert R. Song
*Attorney, Agent, or Firm*—William A. Schuetz

[57] ABSTRACT

A rear seat for an all purpose vehicle has front and rear legs that are releasably latched to pins located in escutcheons in the vehicle floor. The rear seat is manually folded and stored in the vehicle by releasing the rear legs and pivoting the seat forward on the front pins to a vertical position. The seat is removed from the vehicle by releasing the front legs when the seat is in the stored position and lifting the seat off the front pins. The latch mechanisms for the front and rear legs have locks so that the legs are not unlatched unintentionally. A lift assist mechanism is also provided for pivoting the seat forward on the front pins to the stored position.

13 Claims, 3 Drawing Sheets

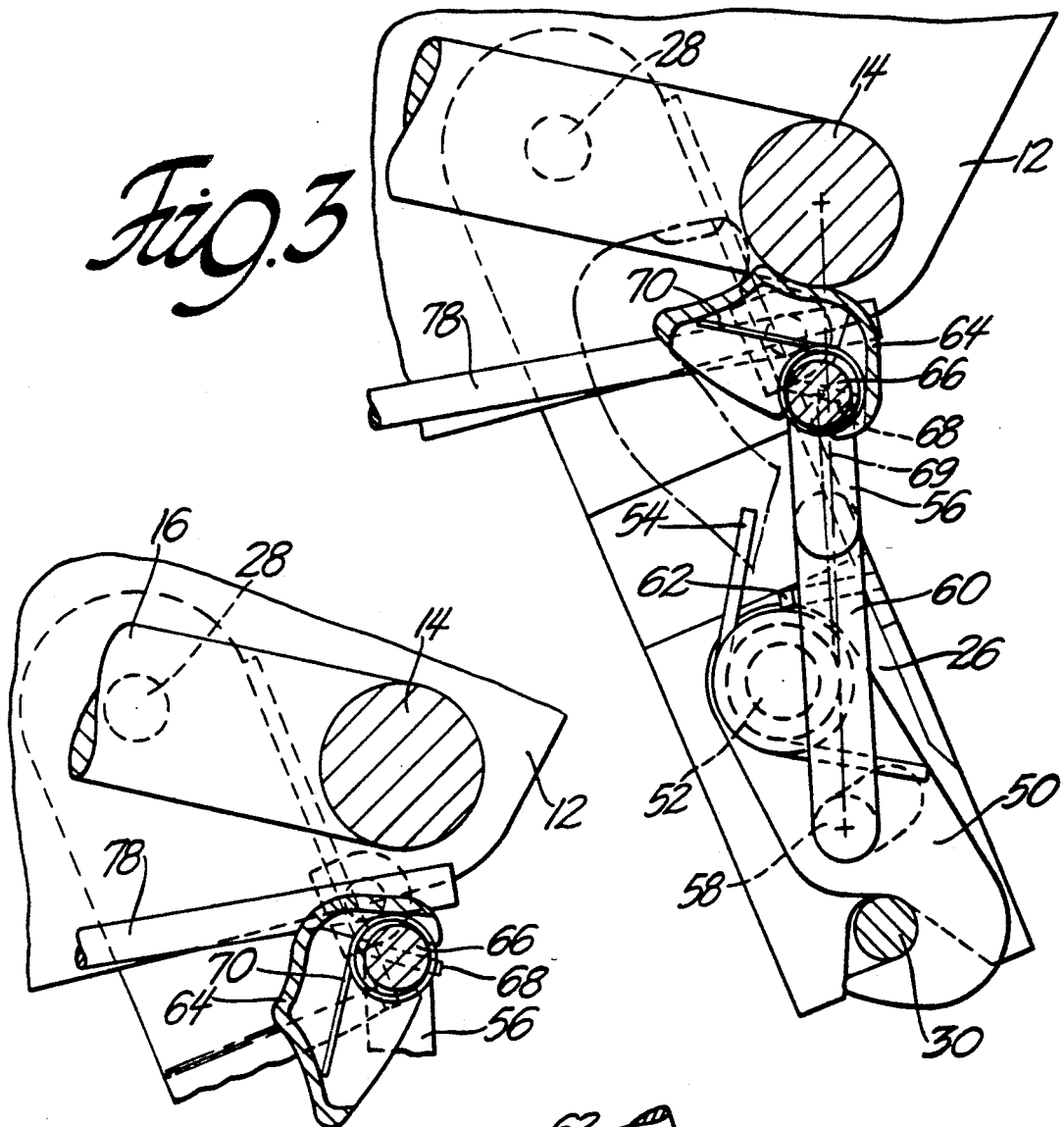
Fig.3
Fig.4
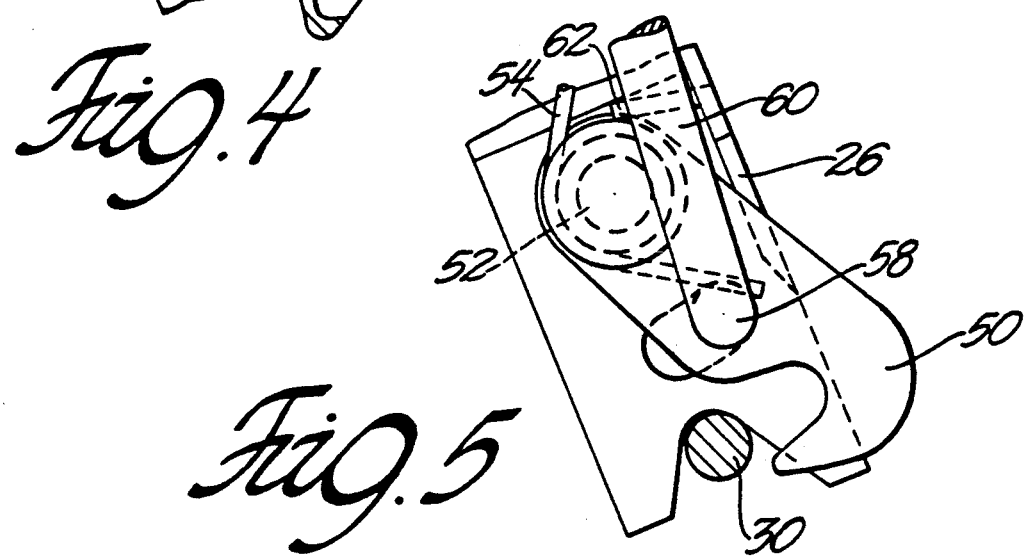
Fig.5

REAR SEAT FOR ALL PURPOSE VEHICLE

BACKGROUND OF THE INVENTION

This invention relates generally to vehicle seats and more particularly to rear seats for all purpose vehicles and the like.

All purpose vehicles, particularly minivans are becoming increasingly popular because they offer great variety in seating configuration for maximizing passenger or cargo transport or providing any desired combination in between. The variety and changability of the seating configuration is enhanced by the use of individual rear passenger seats that are storable in the vehicle as well as removable from the vehicle easily.

U.S. Pat. No. 4,700,989 granted to Jose A. Ercilla Oct. 20, 1987 discloses a storable and removable rear vehicle seat that is popularly referred to as a "flip and fold" seat because the seat back is folded down onto the seat which is then flipped up for storage or removal.

More specifically, the Ercilla seat arrangement has front and rear forks that support the seat on four mounting pins that are recessed in the vehicle floor and manually operable latching arrangements for latching the forks on the mounting pins. The front forks and the rear forks have separate latching arrangements so that the rear forks can be unlatched while the front forks remain latched to flip the seat up for storage in an upright or vertical position.

The Ercilla rear seat arrangement includes a control rod system for locking the manually operable front latching mechanism so that the front latching mechanism cannot be unlatched unless the seat is in the upright stored position in the vehicle. This assures that the front latching mechanism is not unlatched unintentionally. However, this control rod system is complicated and costly.

Furthermore, the Ercilla rear seat arrangement does not include any system for assuring that the manually operable rear latching mechanism is not unlatched unintentionally.

Moreover, Ercilla rear seat arrangement does not have a lift assist mechanism for flipping the seat up to the stored position although there are known lift assist mechanisms that are complicated and costly.

SUMMARY OF THE INVENTION

The object of this invention is to provide a rear seat for a all purpose vehicle or the like that has an improved arrangement that latches the seat in the vehicle securely but yet the seat is manually stored in the vehicle or manually removed from the vehicle easily and without need for any tools.

In one aspect, a feature of the invention is that the rear seat has a mechanism for locking the front latching mechanism that is simple, efficient and cost effective.

In another aspect, a feature of the invention is that the rear seat has a mechanism for locking the rear latching mechanism so that the rear latching mechanism is not unlatched unintentionally.

In yet another aspect, a feature of the invention is that the rear seat has a lift assist mechanism that is simple, efficient and cost effective.

BRIEF DESCRIPTION OF THE DRAWINGS

The above and other objects, features and advantages of the invention will become more apparent from the following description taken in conjunction with the accompanying drawings wherein like references refer to like parts and wherein:

FIG. 3 is an enlargement of another portion of FIG. 1 showing the rear seat in the process of being stored in the vehicle.

FIG. 4 is a view similar to FIG. 3 showing a release lever in another position.

FIG. 5 is a view similar to FIG. 3 showing a latch hook in an unlatched position.

DESCRIPTION OF THE INVENTION

Figure 1:
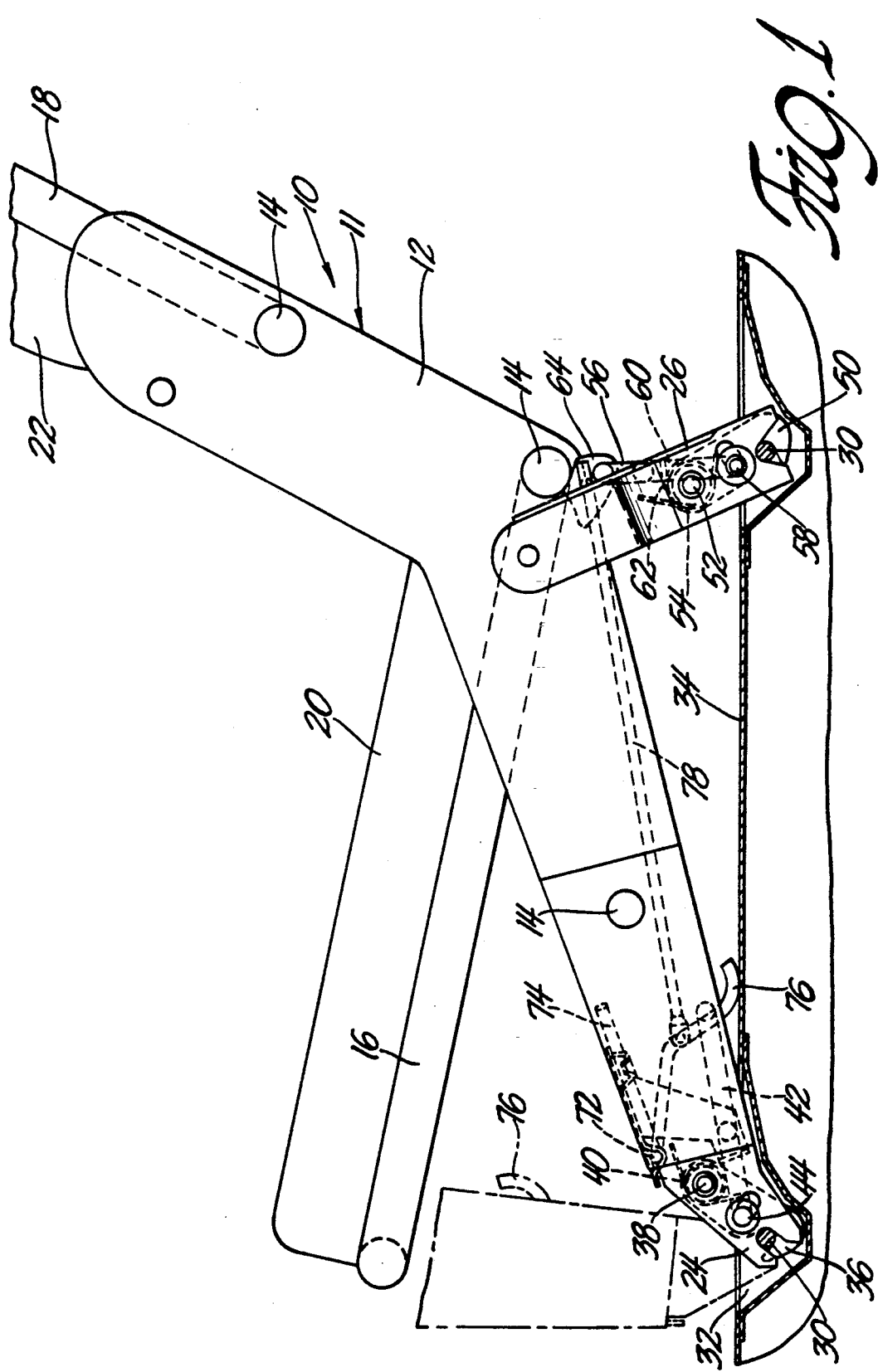
FIG. 1 is a partially sectioned side view of a rear seat of this invention installed in a vehicle.

Referring now to the drawing, the rear seat of this invention is indicated generally at 10. The seat has a frame 11 comprising two side members 12 that are fastened together by a plurality of tubular cross members 14. Tubular cushion frames 16 and 18 are attached to the seat frame 11 to support seat and back cushions 20 and 22 respectively.

The seat frame 11 also includes two front legs 24 and two rear legs 26 that are formed as forks that have pin receiving slots at their lower ends. The front legs or forks 24 are short and fixed to the side members 12 at the front of the seat frame 11. The longer rear legs or forks 26 are secured to the side members 12 at the rear of the seat frame 11 by pivot pins 28 so that the forks 26 fold down to a stored position as explained below.

When installed, the seat frame 11 is supported by four horizontal pins 30 that engage in the respective slots at the lower ends of the front and rear forks 24 and 26 as shown in FIG. 1. The support pins 30 are located in individual wells or escutcheons 32 in the vehicle floor 34.

The rear seat 10 is attached to and supported by these support pins 30 for passenger transportation. However, the rear seat 10 can be detached from the rear support pins 30 and stored in the vehicle or detached from all four support pins 30 and removed from the vehicle as explained below.

FRONT LATCHING MECHANISM

When the rear seat 10 is installed in the vehicle as shown in FIG. 1, the front forks 24 are latched to the front support pins 30 by front hooks 36. These hooks are secured to the respective front forks 24 by rivet pins 38 so that the hooks 36 rotate with respect to the front forks 24 to latch and unlatch the pins 30 in the pin receiving slots. Torsion springs 40 mounted on the rivet pins 38 bias the front hooks 36 clockwise to the latched position shown in FIG. 1.

The front hooks 36 are operated by a front, rod shaped, lift handle 42 that is disposed between the lower portions of the side members 12 that are beneath the seat cushion frame 16. The lift handle 42 has a trunnion 44 at each end that cooperates with the front forks and hooks at each respective end. Each trunnion 44 extends through a hole in one front hook 36 and then through a kidney shaped slot in the front fork 24 next to it so that the front lift handle 42 rotates the front hook 36 with respect to the front fork 24 only within the limits of the kidney shaped slot as best shown in FIG. 2.

The lift handle 42 also has a slide portion 46 at each end that slide in yokes 47 attached to the respective side members 12 so that the lift handle 42 slides in a direction that is generally parallel with the lower portions of the side members 12.

Figure 2:
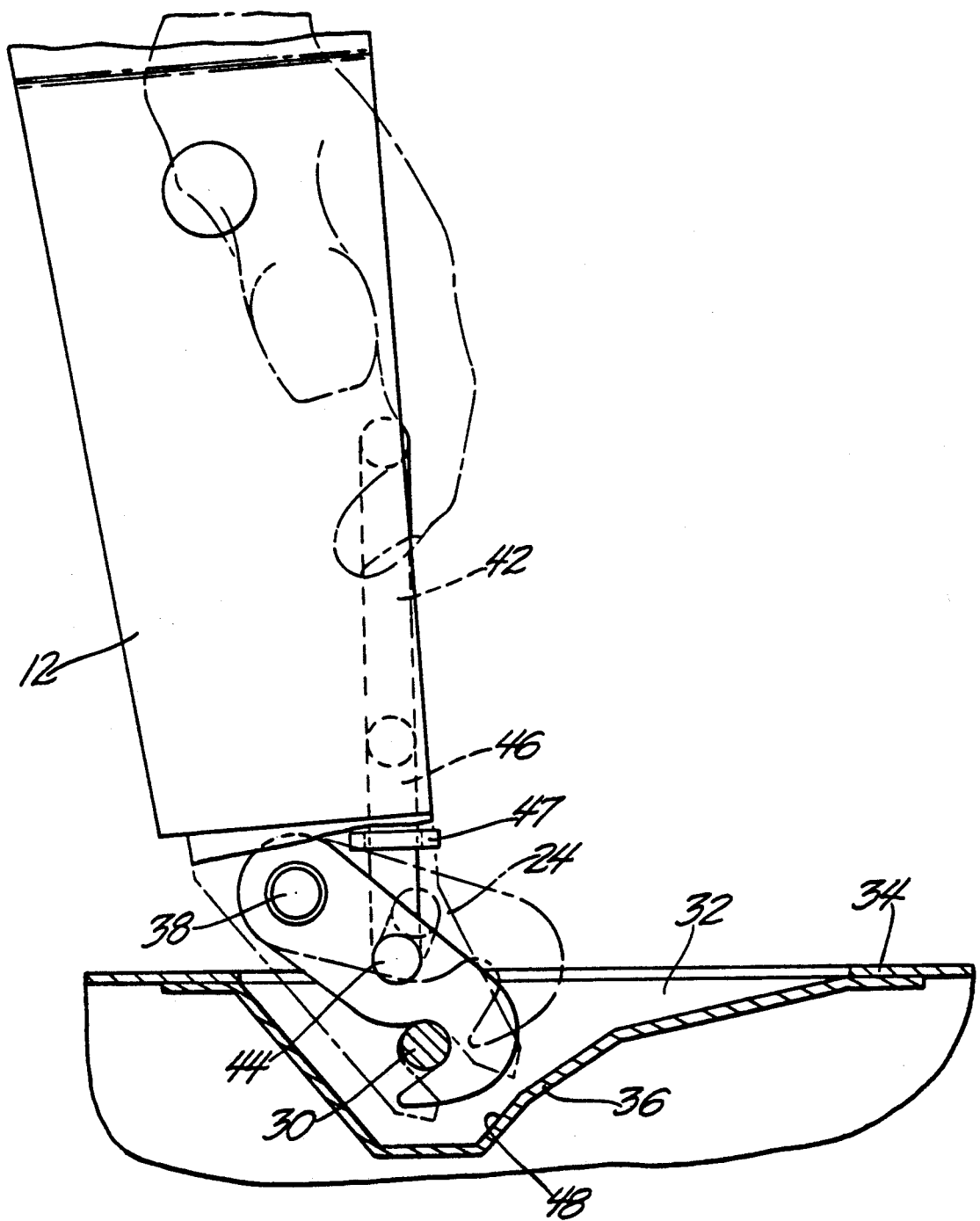
FIG. 2 is an enlargement of a portion of FIG. 1 showing the rear seat in the process of being removed from the vehicle.

The front hooks 36 are normally biased by the torsion springs 40 to the latched position shown in FIGS. 1 and 2. However, when the front lift handle 42 is lifted, that is, pulled away from the slotted ends of the front forks 24, the front hooks 36 are rotated against the bias of the torsion springs 40 to the unlatched position unblocking the open end of the slots in the front forks 24 as shown in FIG. 5. This unlatches the rear seat 10 from the front mounting pins 30.

In one aspect an important feature of the invention is that the front hooks 36 are locked in the latched position so that the rear seat 10 cannot be unlatched from the front mounting pins 30 unintentionally when it is installed in the vehicle. This lock feature is provided by at least one and preferably both front escutcheons 32. More specifically at least one front escutcheon or well 32 has a fixed abutment 48 that serves two functions. First the abutment 48 locks the front hook 36 in the latched position when the rear seat is installed in the vehicle because the abutment 48 blocks counterclockwise rotation of the front hook 36 with respect to the front fork 24 as shown in FIG 1. Consequently the rear seat 10 must be flipped or pivoted up to the stored position shown in FIG. 2 before the front hooks 36 can be rotated counterclockwise to unlatch the rear seat 10 fully and remove it from the vehicle. This prevents unintentional unlatching of the front hooks 36 and also provides a foolproof method of assuring the correct procedure for storing the rear seat 10 in the vehicle.

Secondly the fixed abutment 48 does not allow installation of the rear seat 10 in the vehicle unless the front forks 24 are dropped down on the front pins 30 and latched to the front pins 30 by front hooks 36 before the rear forks 26 are engaged. This is because the front hooks 36 cannot rotate from the unlatched position to the latched position under the front pins 30 unless the side members 12 are in a vertical position as shown in FIG. 2. Consequently the abutment 48 also provides a foolproof method of assuring the correct procedure for installing the rear seat 10 in the vehicle.

REAR LATCHING MECHANISM

When the rear seat 10 is installed in the vehicle as shown in FIG. 1, the rear forks 26 are latched to the rear support pins 30 by rear hooks 50. These hooks are secured to the respective rear forks 26 by rivet pins 52 so that the hooks 50 rotate with respect to the rear forks 26 to latch and unlatch the rear pins 30 in the pin receiving slots. Torsion springs 54 mounted on the rivet pins 52 bias the rear hooks 50 clockwise to the latched position shown in FIG. 1.

The rear hooks 50 are operated by a rear, rod shaped, lift handle 56 that is disposed between the side members 12 and beneath the rear tubular cross member 14. The lift handle 56 has a trunnion 58 at each end that cooperates with the rear forks and hooks at each respective end. Each trunnion 58 extends through a hole in one rear hook 50 and then through a kidney shaped slot in the rear fork 26 next to it so that the rear lift handle 56 rotates the rear hook 50 with respect to the front fork 24 only within the limits of the kidney shaped slot.

The lift handle 56 also has a slide portion 60 at each end that slides in yokes 62 attached to the respective side members 12 so that the lift handle 56 slides in a direction that is generally vertical when the rear seat 10 is installed in the vehicle as shown in FIGS. 1 and 3.

The rear hooks 50 are normally biased by the torsion springs 54 to the latched position shown in FIGS. 1 and 3. However, when the rear lift handle 56 is lifted, that is, pulled away from the slotted ends of the forks 26, the rear hooks 50 are rotated against the bias of the torsion springs 54 to the unlatched position unblocking the open end of the slots in the rear forks 26 as shown in phantom in FIG. 3. This unlatches the rear seat 10 from the rear mounting pins 30.

In another aspect, an important feature of the invention is that the rear hooks 50 are also locked in the latched position so that the rear seat 10 cannot be unlatched from the rear mounting pins 30 unintentionally when it is installed in the vehicle.

This second lock feature is provided by a cam shaped release lever 64 that is journalled on a top cross rod portion 66 of the rear lift handle 56. This release lever 64 is biased in a clockwise direction with respect to the cross rod portion 66 against a stop pin 68 by a torsion spring 70 as shown in FIGS. 1 and 3. This is a locked position where the cam shaped release lever 64 engages the rear cross member 14 so that the rear lift handle 56 cannot be raised to unlatch the rear hooks 50. It should also be noted that the center of the cross rod portion 66 is over center with respect to the plane 69 containing centers of the trunnions 58 and the rear cross member 14. Consequently, lifting the rear lift handle 56 when the release lever 64 is in the locked position just holds the rear hooks 50 in the latched position with greater force.

The rear latching mechanism is unlocked by rotating the release lever 64 counterclockwise against the bias of torsion spring 70 until it bottoms out on the other end of the stop pin 68 and the release lever 64 is spaced from the rear cross member 14 as shown in FIG. 4. The rear lift handle 56 is then lifted to rotate the rear hooks 50 to their unlatched position. Once the rear hooks 58 are unlatched, the rear seat 10 is flipped or pivoted up about the front mounting pins 30 to the vertical or stored position that is shown in phantom in FIG. 1 and in FIG. 2. Thus the second stop, that is the release lever 64 prevents unintentional unlatching of the rear hooks 50.

LIFT ASSIST MECHANISM

In yet another aspect, a feature of the invention is the provision of a simple, efficient and cost effective lift assist mechanism that assists the operator in pivoting the rear seat upwardly about the front mounting pins 30 when the rear hooks 58 are unlatched. This lift assist mechanism comprises a torsion bar 72 that has an anchor 74 at one end that is secured to one side member 12 and a foot 76 at the other end that is inside the other side member 12. The foot 76 engages the vehicle floor 34 so that the torsion bar 72 applies a counterclockwise torque to the seat frame 11. The torsion bar 72 is wound up when the rear seat 10 is installed. Consequently the torsion bar 72 assists in flipping or raising up the rear seat from the installed position shown in FIGS. 1 and 3 to the stored position shown in FIG. 2 when the rear hooks 50 are unlatched.

The foot 76 is also attached to one of the rear forks or legs 26 by a tie bar 78 so that the rear legs 26 are folded down as the rear seat 10 is raised up to the stored position.

The invention has been described in an illustrative manner, and it is to be understood that the terminology which has been used is intended to be in the nature of words of description rather than of limitation.

Obviously, many modifications and variations of the present invention in light of the above teachings may be made. It is, therefore, to be understood that, within the scope of the appended claims, the invention may be practiced otherwise than as specifically described.

The embodiments of the invention in which an exclusive property or privilege is claimed are defined as follows:

1. A rear seat for an all purpose vehicle or the like comprising;
    a frame having a pair of front forks and a pair of rear forks for supporting the rear seat on four mounting pins that are disposed in escutcheons in a vehicle floor,
    means for latching the pair of front forks on two mounting pins including front hooks that are pivotally mounted for rotation between a latched position and an unlatched position,
    a handled for rotating the front hooks backs and forth between the latched position and the unlatched position, and
    means for locking the front hooks in the latched position that includes at least one abutment in one of said escutcheons that prevents rotation of one front hook when it is a latched position in said one escutcheon and the rear seat is in an installed position.

2. The rear seat as defined in claim 1 wherein the frame pivots on the two mounting pins when the pair of front forks are latched on the two mounting pins to a vertical stored position where the front hooks are rotatable to an unlatched position by the handle.

3. A rear seat for an all purpose vehicle or the like comprising;
    a frame having a pair of front forks and a pair of rear forks for supporting the rear seat on four mounting pins that are disposed in escutcheons in a vehicle floor,
    means for latching the pair of front forks on two mounting pins including front hooks that are pivotally mounted on the front forks for rotation between a latched position and an unlatched position,
    a handle connected to the hooks for rotating the front hooks back and forth between the latched position and the unlatched position in unison,
    means for locking the front hooks in the latched position that includes at least one abutment in one of said escutcheons that prevents rotation of the one front hook when it is a latched position in said one escutcheon and the rear seat is supported by the front and rear forks on the four mounting pins, and
    the frame being pivotal on the two mounting pins when the pair of front forks are latched on the two mounting pins to a vertical stored position where the front hooks are rotatable to an unlatched position by the handle.

4. The rear seat as defined in claim 3 wherein the means for locking the front hooks in the latched position includes abutments in the escutcheons that prevent rotation of the front hooks when the front hooks are in a latched position in the escutcheons and the rear seat is supported by the front and rear forks on the four mounting pins.

5. A rear seat for an all purpose vehicle or the like comprising:
    a frame having a pair of front forks and a pair of rear forks for supporting the rear seat on four mounting pins that are disposed in escutcheons in a vehicle floor,
    means for latching the pair of rear forks on two mounting pins including rear hooks that are pivotally mounted for rotation between a latched position and an unlatched position,
    a handle connected to the rear hooks for rotating the rear hooks back and forth between the latched position and the unlatched position, and
    means for locking the rear hooks in the latched position that includes a release level rotatably mounted on the handle that engages the frame to hold the handle in a position where the handle holds the rear hooks in the latched position.

6. The rear seat as defined in claim 5 wherein the release lever is cam shaped and spring biased into engagement with a tubular cross member of the frame to hold the handle in the position where the handle holds the rear hook in the latched position.

7. The rear seat as defined in claim 6 wherein the release lever is rotatable to a position spaced from the tubular cross member so that the handle is operable to rotate the rear hooks to an unlatched position.

8. A rear seat for an all purpose vehicle or the like comprising:
    a frame having a pair of front forks and a pair of rear forks for supporting the rear seat on four mounting pins that are disposed in escutcheons in a vehicle floor,
    means for latching the pair of rear forks on two mounting pins including rear hooks that are pivotally mounted for rotation between a latched position and an unlatched position,
    a handle having trunnions at each end that are pivotally connected to the rear hooks for rotating the rear hooks back and forth between the latched position and the unlatched position, and
    means for locking the rear hooks in the latched position that includes a cam shaped release lever that is rotatably mounted on a cross rod portion of the handle and that is spring biased into engagement with a tubular cross member of the frame to hold the handle in a position where the handle holds the rear hook in the latched position,
    the cross rod portion of the handle having a center located over center of a plane containing the centers of the trunnions and the tubular cross member of the frame so that operation of the handle when the release lever engages the tubular cross member, holds the rear hooks in the latched position with greater force.

9. A rear seat for an all purpose vehicle or the like comprising;
    a frame having a pair of front forks and a pair of rear forks for supporting the rear seat on four mounting pins that are disposed in escutcheons in a vehicle floor,
    means for latching the pair of front forks on two front mounting pins including front hooks that are pivotally mounted for rotation between a latched position and an unlatched position,
    a handle for rotating the front hooks back and forth between the latched position and the unlatched position,
    the frame being pivotal on the two front mounting pins when the pair of front forks are latched on the two front mounting pins to a vertical stored position, means for latching the pair of rear forks on two rear mounting pins including rear hooks that are pivotally mounted for rotation between a latched position and an unlatched position, a handle for rotating the rear hooks back and forth between the latched position and the unlatched position, and a lift assist mechanism for flipping the seat frame up to a vertical stored position when the rear hooks are unlatched and the front hooks are latched so that the seat frame is pivotal on the two front mounting pins, the lift assist mechanism including a torsion rod having one end connected to said frame, a foot adjacent its other end for engaging the vehicle floor.

10. The rear seat as defined in claim 9 wherein the torsion rod is connected to a side member of the frame at said one end and the foot at the other end of the torsion rod is disposed inside an opposite side member of the frame.

11. The rear seat as defined in claim 10 wherein the rear legs are pivotally mounted to the frame and the foot of the lift mechanism is connected to one rear leg so that the rear legs fold down when the seat is flipped up to the stored position.

12. The rear seat as defined in claim 9 further including means for locking the front hooks in the latched position that includes at least one abutment in one of said escutcheon that prevents rotation of one front hook when it is a latched position in said one escutcheon.

13. The rear seat as defined in claim 9 further including means for locking the rear hooks in the latched position that includes a release lever rotatably mounted on the handle and engaging the frame to hold the handle in a position where it holds the rear hooks in the latched position.

* * * * *